Figure 1:
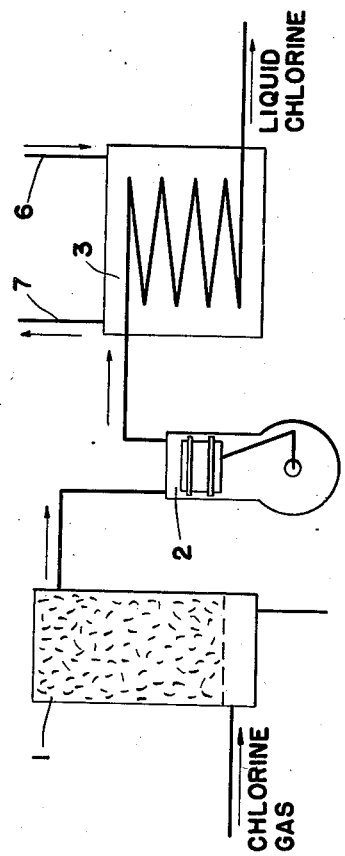
Figure 2:
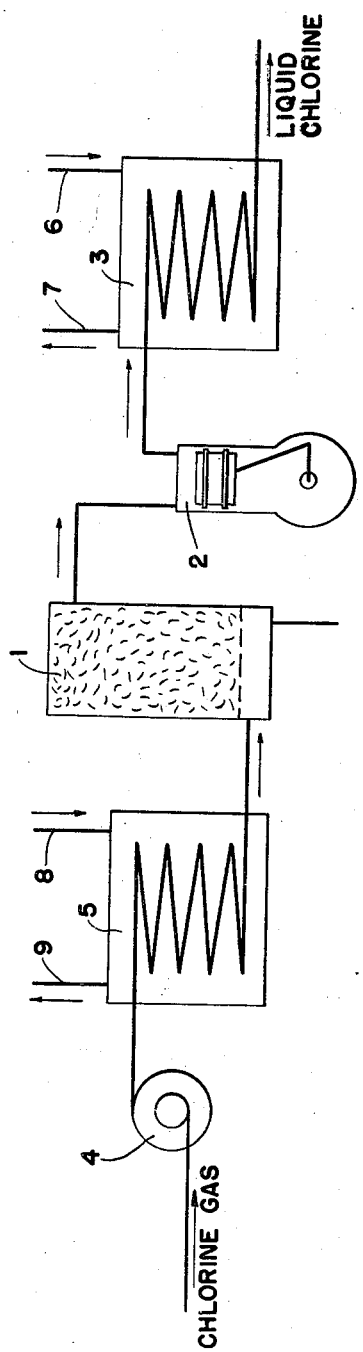

Nov. 9, 1943.    L. H. SPERRY    2,333,748
TREATMENT OF CHLORINE
Filed June 25, 1941

LUKE H. SPERRY
INVENTOR.

BY Cleveland B. Hollabaugh

Patented Nov. 9, 1943

2,333,748

UNITED STATES PATENT OFFICE 2,333,748

TREATMENT OF CHLORINE

Luke H. Sperry, Wilmington, Del., assignor to Hercules Powder Company, Wilmington, Del., a corporation of Delaware Application June 25, 1941, Serial No. 399,654

5 Claims. (Cl. 62—175)

This invention relates to a method for liquefying chlorine and to apparatus for carrying out the method.

Chlorine may be liquefied by compressing it to very high pressures or refrigerating it to very low temperatures. Usually both compression and refrigeration are combined. From purely thermodynamic considerations, liquefaction may be brought about either by mild pressure with strong refrigeration to very low temperatures or by high pressure with cooling to merely moderately low temperatures.

The second of these two courses would be the more desirable since it permits refrigeration with ordinary cooling brines whereas very low temperatures are obtainable only at considerable expense. However, compression to high pressures can be accomplished only with positive pressure equipment such as reciprocating compressors and, furthermore, close fitting of the moving parts is essential. Compression to high pressures has been unsatisfactory, if not altogether impractical, as chlorine gas dried in the usual manner by sulfuric acid, has a strongly erosive action on the wearing and sealing surfaces, especially on piston rings. Clearances soon become excessive, or the equipment becomes altogether unfit for use and must be repaired.

It is an object of this invention to provide a method and means for liquefying chlorine at high pressures under mild conditions of refrigeration while avoiding the difficulties in high pressure compression which have been mentioned. Other objects will appear hereinafter.

It has now been found that the erosion of positive pressure compressors at the fitting surfaces is caused chiefly by traces of sulfuric acid in the chlorine. This sulfuric acid is introduced in the operation of drying the chlorine with strong sulfuric acid and/or by sulfuric acid seals used in pumps and other equipment. In accordance with this invention, dry chlorine gas contaminated by traces of sulfuric acid is liquefied by a process which comprises passing the chlorine gas through a bed of substantially dry coke to a positive pressure reciprocating compressor wherein the gas is compressed to a relatively high pressure, and then cooling and condensing the chlorine at a moderately low temperature.

The accompanying drawing illustrates the manner in which the invention is carried out. In the drawing:

Figure I represents diagrammatically a combination of apparatus suitable for carrying out the process.

Figure II is similar but shows additional apparatus preferably combined with that of Figure I.

Referring to Figure I, 1 designates a tower packed with coke, 2 a reciprocating positive pressure compressor equipped with close-fitting carbon piston rings; 3 is a condenser for compressed chlorine equipped with suitable inlet 6 and outlet 7 for a cooling fluid such as refrigerated brine.

Referring to Figure II, it will be noted that the apparatus there shown is like that of Figure I except that it is preceded by a compressor 4 for the chlorine which is of the rotary type and thus capable of imparting only a moderate pressure increment to the gas; 5 is a heat interchanger capable of cooling the chlorine gas and is equipped with suitable inlet 8 and outlet 9 for a cooling medium such as cold water or brine.

In operating in accordance with the method of this invention chlorine gas obtained from electrolytic cells or by chemical oxidation processes such as the Deacon or other process in which a chloride is subjected to oxidation under acid conditions, is dried by contact with sulfuric acid, usually in fairly extensive surfaces, for example, by being passed through a bed of inert porous material wet with strong sulfuric acid. The chlorine in contact with sulfuric acid in the drying operation or in contact with sulfuric acid which may be used to seal pumps and other handling equipment, picks up small quantities which may be mere traces of sulfuric acid, and which are probably in a colloidal form. The sulphuric acid will be in an amount between about 0.0005% and about 0.05% by weight of the gaseous chlorine, usually between about 0.001% and about 0.01%. The gas containing the sulfuric acid impurity is then passed through a bed of coke preferably in the form of a packed bed of about two feet to about six feet depth in a tower. In order to obtain substantially complete removal of the sulfuric acid, the chlorine is passed through the coke with a superficial velocity not exceeding about one foot per second and preferably not exceeding 0.25 foot per second. The coke is substantially dry and will contain at most the minor amount of liquid accumulated over a period of time by absorption of the traces of sulfuric acid from the chlorine passing therethrough. Usually the chlorine is passed up through the coke bed which will be slightly wet with accumulated acid in the lower portion of the bed but which will be dry in the upper portion, accumulated acid being drained off from the tower or washed out occasionally. The chlorine is then led to a positive pressure compressor such as the reciprocating compressor shown in Figure I. The compressor raises the chlorine pressure to above about 60 pounds per square inch usually to a pressure between about 60 pounds per square inch and 130 pounds per square inch. The chlorine is then cooled to a temperature at which it becomes liquid, relatively mild refrigerating conditions being suitable. For example, at a pressure of 120 pounds per square inch, liquefaction commences at 31° C. and the chlorine may be recovered from accompanying diluent gases by cooling in the range between 31° C. and about —15° C., satisfactory high recovery being obtained cooling merely in the range between about 0° C. and about 15° C.

Preferably the chlorine gas is given a mild compression with the usual rotary compressor sealed with sulfuric acid prior to being passed through the coke tower. With this mode of operation, the chlorine is usually cooled, for example, in a heat interchanger supplied with cold water prior to being passed through the bed of coke. Figure II illustrates this modification. Mild precompression and cooling have the advantage of placing the chlorine gas which is contaminated with sulfuric acid in a more desirable condition for the removal of the acid. It also decreases the load upon the positive pressure compressor subsequently utilized thereby improving efficiency; prevents an unduly high temperature rise in the compressor; and provides a pressure head for forcing the chlorine gas through the bed of coke. The pre-compressor will operate to place the gas under a pressure between about 5 pounds per square inch and about 20 pounds per square inch. The cooling associated with pre-compression will usually reduce the temperature of the chlorine gas to between about 0° C. and about 10° C.

Thus, for example, gaseous electrolytic chlorine at 10° C. and atmospheric pressure is dried by contact with 95% sulfuric acid, picking up 0.006% acid by weight of the chlorine gas. It is passed through a tower packed to a depth of four feet with dry coke at a gas velocity of 0.15 foot per second and then to a reciprocating compressor which raises its pressure to 120 pounds per square inch. It is then passed through a cooling coil cooled by water at 16° C. and through a cooling condenser where the compressed gas is cooled at 3° C. and condensed. In a somewhat improved operation, electrolytic chlorine dried by sulfuric acid in the same manner, and contaminated by traces of the acid, is pre-compressed to 18 pounds per square inch pressure by means of a rotary compressor of the Nash type sealed with 95% sulfuric acid. It is then cooled to 8° C. in a coil cooled by cold water after which it passed through a coke-packed tower, compressed and liquefied as in the previous example. In this case, a cooling condenser is satisfactory for liquefaction after compression to 120° C.

It will be appreciated that the cooling condenser referred to in Figures I and II may be divided into a pre-cooler and a cooling condenser proper in which the actual liquefaction takes place. It will also be understood that tail gases may be scrubbed in the usual manner to absorb any residual chlorine, if desired.

Liquefaction according to this invention enables the use of positive pressure equipment on a practical basis for the compression of industrial chlorine. This permits compressing the chlorine to such high pressures that simple economical cooling substances are adequate to being about the liquefaction of the compressed gas. It has been found that there is also brought about a considerable decrease in the sludging and corrosion difficulties encountered in the operation of the chlorine condenser.

It will be understood that the details and examples hereinbefore set forth are illustrative only and that the invention as broadly described and claimed is in no way limited thereby.

What I claim and desire to protect by Letters Patent is:

1. A method for liquefying dry chlorine gas contaminated with small quantities of sulfuric acid which comprises passing the said gas through a bed of coke wherein contaminating sulfuric acid is removed, compressing the gas in a positive pressure compressor, and cooling the compressed gas to a temperature at which liquefaction occurs to bring about its condensation.

2. A method for liquefying dry chlorine gas contaminated with small quantities of sulfuric acid which comprises compressing and cooling the said gas; passing it through a bed of coke wherein contaminating sulfuric acid is removed, further compressing the gas in a positive pressure compressor, and cooling the compressed gas to a temperature at which liquefaction occurs to bring about its condensation.

3. A method for liquefying dry chlorine gas contaminated with small quantities of sulfuric acid which comprises passing the said gas through a bed of coke wherein contaminating sulfuric acid is removed, compressing the gas in a positive compressor to a pressure of at least 60 pounds per square inch, and cooling the compressed gas to a temperature at which liquefaction occurs to bring about its condensation.

4. A method for liquefying dry chlorine gas contaminated with small quantities of sulfuric acid which comprises compressing the gas to a pressure of between about 5 and about 20 pounds per square inch, cooling the gas, passing the gas through a bed of coke wherein the small quantities of sulfuric acid are removed, further compressing the gas in a reciprocating compressor to a pressure in excess of 60 pounds per square inch, and cooling the compressed gas to a temperature at which liquefaction occurs to condense the chlorine.

5. An apparatus for liquefying chlorine comprising a low pressure compressor with associated means for cooling chlorine gas compressed therein, a vessel packed with coke connected by a conduit to said cooling means, a positive pressure compressor for the chlorine, a cooling condenser for the compressed chlorine, and conduits for conducting chlorine from the coke packed vessel to the positive pressure compressor and from the latter compressor to the condenser.

LUKE H. SPERRY.